United States Patent Office 3,515,349
Patented June 2, 1970

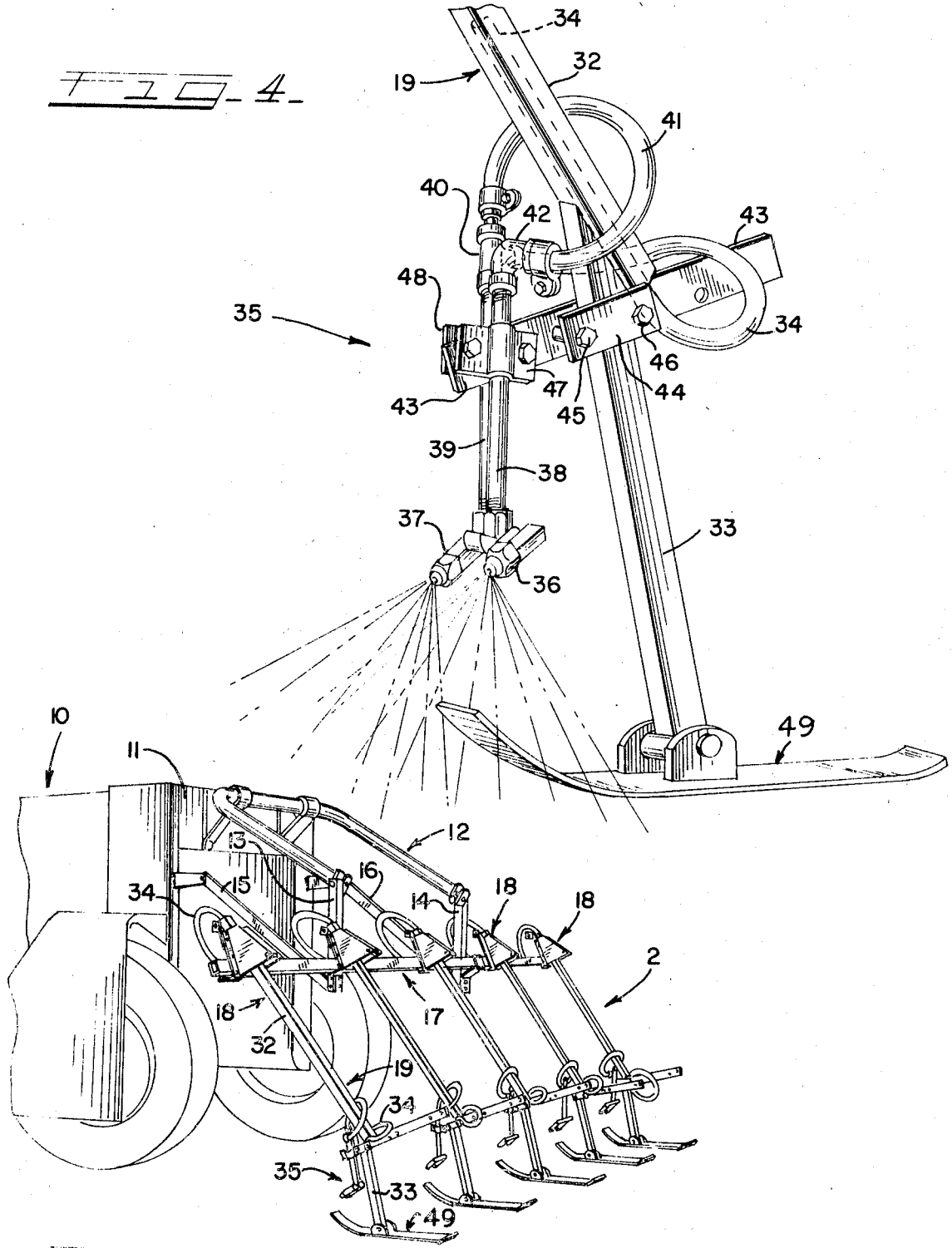

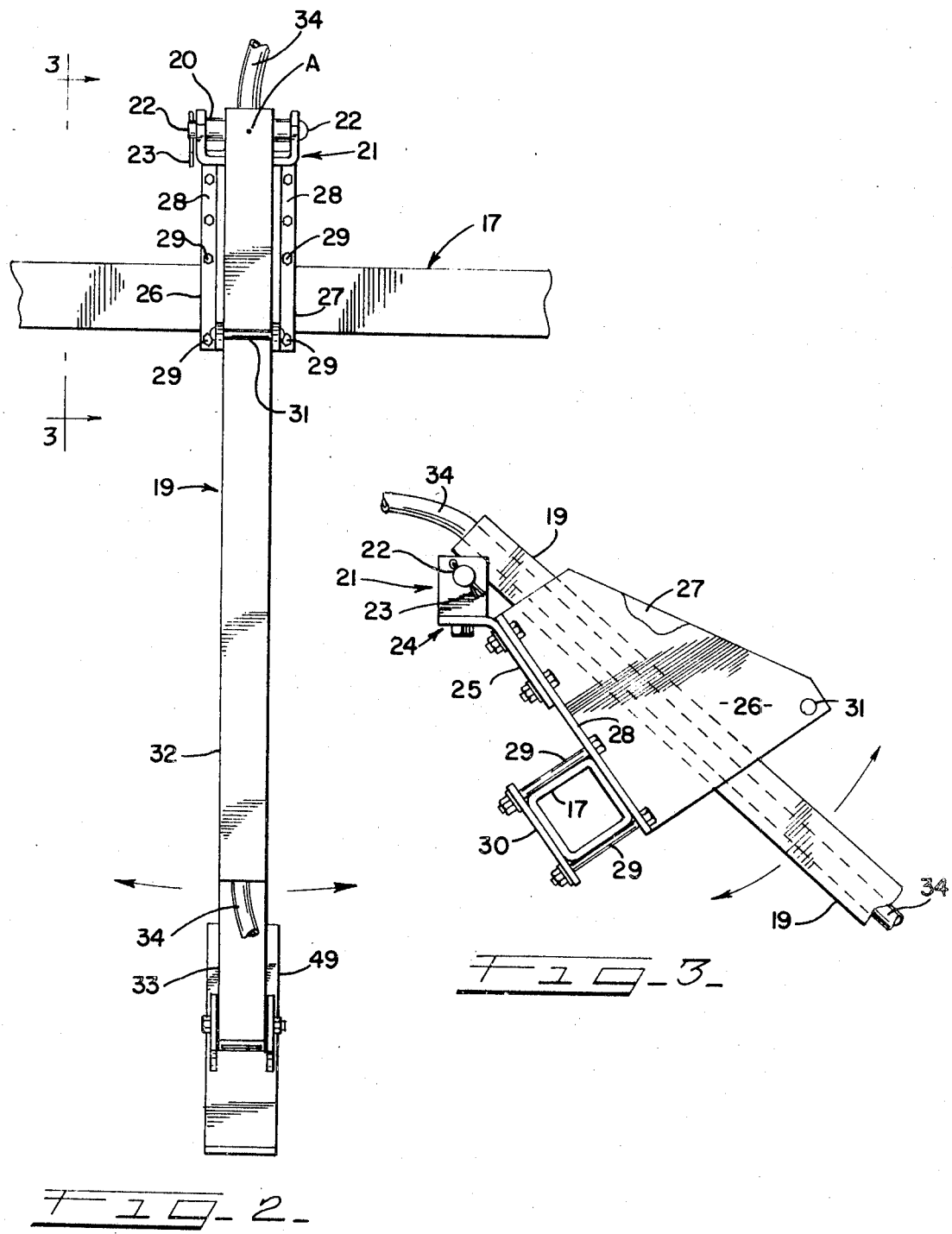

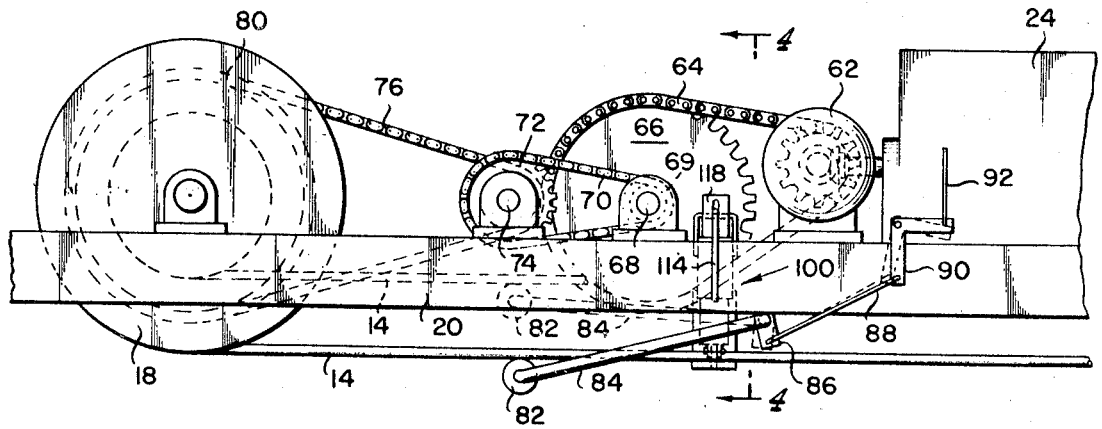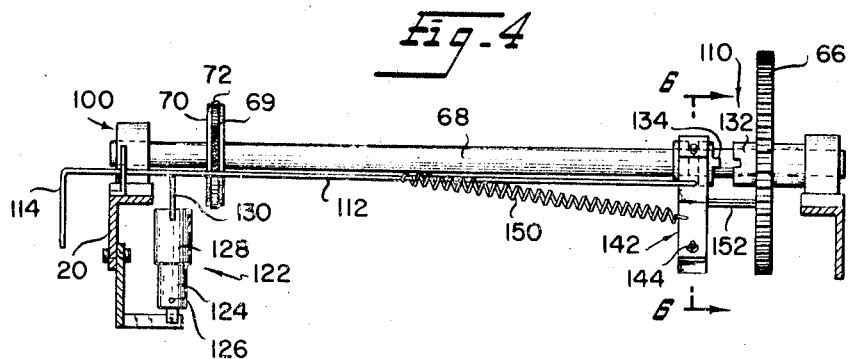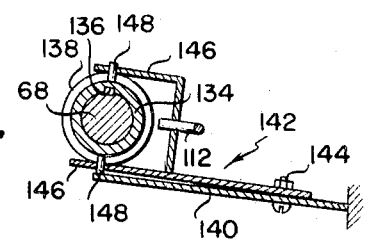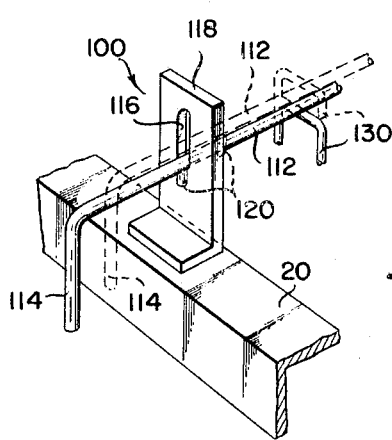

3,515,349
BOOM ASSEMBLY FOR SPRAYERS
Charles D. Mecklin, James M. Francis, and George H. Hale, Memphis, Tenn., assignors to International Harvester Company, Chicago, Ill., a corporation of Delaware
Filed Mar. 20, 1968, Ser. No. 714,699
Int. Cl. B05b 1/20
U.S. Cl. 239—169     5 Claims

ABSTRACT OF THE DISCLOSURE

A crop spraying apparatus including a boom assembly mounted on a mobile carrier for directing fluid spray adjacent to parallel crop rows. A plurality of arms are pivotally coupled to a transverse boom so as to extend therefrom in trailing relation for pivoting movement in respective vertical planes disposed at right angles to the boom. A spray device is carried on each arm. Guide means are mounted on the boom for each arm to prevent the arm from wobbling or swinging out of its respective vertical plane such that precise control of the position of each spray device relative to the crop rows is accomplished.

BACKGROUND OF THE INVENTION

Field of the invention

This invention relates generally to crop spraying devices and more particularly to an improved boom assembly adapted to be coupled to a mobile carrier movable along crop rows for spraying operations.

Description of the prior art

Spraying devices of the so-called directed-spray or layby boom type are characterized by the requirement that the spray be accurately and precisely directed so as to cover the plants or the ground adjacent to the crop rows without overlapping spray patterns or other inaccuracies of spray placement. The principal problem encountered in conventional sprayers of the above types is that the arms carrying the spray nozzles are subject to wobbling or lateral swinging relative to the boom member to which the arms are pivotally connected. The spray nozzles move laterally relative to the parallel crop rows being sprayed with the result that the fluid spray from each nozzle may inpinge upon the plants or the ground when such is undesired. For example, it is obviously undesirable for a weed killing chemical to be sprayed upon the plants instead of upon the ground between the plant rows. Even though the operator is extremely careful in constantly maintaining the alignment of the mobile carrier with the crop rows, the wobbling or swinging of the arms will defeat his best efforts.

A further problem with many conventional directed spray or layby boom type devices is in the arrangement of the fluid conducting hoses relative to the nozzle-supporting arms. In many such devices the hose loops or sags from the transverse boom to the spray nozzle so as to be disposed for possible entanglement with the crop being sprayed. In an attempt to solve this problem the arm itself may be used as the fluid conduit in place of a hose. This, however, introduces problems of corrosion and undue expense of manufacture. Since many chemicals used in agricultural spraying are highly corrosive, the arm is subject to the harmful corrosive effects of the chemicals. Moreover, expensive fittings must be used to insure fluid-tight flow of fluid into and out of the arm.

It is desirable that row crop spraying devices be readily convertible or adjustable to perform a variety of spraying operations such as applying insecticides or herbicides. In directed-spray operations, the spray nozzles may be positioned to direct the spray (an insecticide, for example) directly onto the plants, whereas a so-called "layby" spraying operation may involve spraying a herbicide onto the ground between the crop rows. Many conventional sprayers have not included features permitting convertibility from directed-spray to layby spraying without requiring the use of separate components for each type of spraying Consequently, the spraying device must be modified by the attachment and detachment of separate components in order to be used for both types of spraying

SUMMARY

With the foregoing in mind it is accordingly a primary object of the invention to provide an improved boom assembly for sprayers in which lateral or swinging movement of the spray-emitting devices relative to the supporting structure is virtually eliminated, with the result that placement of the spray pattern relative to the areas to be sprayed may be more accurately controlled.

Another object is to provide a boom assembly for sprayers wherein substantial portions of the fluid-conducting hoses are arranged to be protected from contact and entanglement with the crop being sprayed and the spray device supporting structure is not subject to corrosion by the chemicals being sprayed.

Another object is to provide an improved boom assembly for sprayers which is readily adjustable or convertible to perform a variety of spraying operations without requiring the use of a variety of different components.

Briefly, these and many other objects and advantages of the invention are attained by providing an improved boom assembly for sprayers including at least one arm pivotally coupled to the boom for supporting a spray device proximate to the ground for row crop spraying operations. Guide means are supported on the boom in cooperative relation with the arm for restricting movement of the arm to pivoting movement within a vertical plane disposed at right angles to the boom. The arm is hollow or tubular in effect throughout a portion of its length so that the hose for conducting spray to the spray device may be enclosed therein.

The invention further includes means for mounting the spray device on the arm in a wide variety of positions to facilitate a variety of spraying operations.

The invention as briefly summarized above effectively solves many of the problems encountered with prior devices. The guide means prevents the arm from swinging or wobbling laterally and thus insures that the spray devices will be maintained in the proper position relative to the crop rows. Since a substantial portion of the length of the fluid-conducting hoses is enclosed within the arm, the hoses are protected from entanglement with the crop so as to provide minimum plant disturbance. Moreover, the arms are not subjected to the corrosive effects of the chemicals being sprayed since the arms are not utilized as fluid conduits.

The sprayer boom assembly is readily adjustable or convertible for various spraying operations since the spray devices are supported by means permitting ready adjustment of the positions and orientation of the spray devices.

BRIEF DESCRIPTION OF THE DRAWINGS

FIG. 1 is a fragmentary perspective view illustrating the improved boom assembly of the invention mounted on the rear of a mobile carrier;

FIG. 2 is a fragmentary view of a portion of the boom assembly of the invention looking in the direction of arrow 2 in FIG. 1;

FIG. 3 is a fragmentary side elevation view looking in the direction of arrow 3 in FIG. 2; and FIG. 4 is a fragmentary enlarged perspective view of the spray device portion of the boom assembly of the invention.

DESCRIPTION OF THE PREFERRED EMBODIMENT

Referring first to FIG. 1, there is shown the rear portion of a mobile carrier 10 which is of the self-propelled so-called high clearance type known in the art. The carrier 10 includes a rear frame 11 to which a U-shaped lift arm 12 is pivotally connected for lifting and lowering movement. A pair of vertically disposed support arms 13 and 14 are pivotally suspended from the lift arm 12. A pair of links 15 and 16 are pivotally connected from the frame 11 to the respective lower ends of the support arms 13 and 14. The foregoing constitutes conventional lift structure whereby the support arms 13 and 14 are movable vertically in response to raising and lowering of the lift arm 12 through suitable mechanical or hydraulic lift mechanisms (not shown).

An elongated horizontal boom 17 is mounted on the support arms 13 and 14 by suitable brackets so as to extend transversely to the direction of travel of the carrier 10. Accordingly, the boom 17 extends across the crop rows along which the carrier 10 is driven during a spraying operation.

A plurality of arm assemblies 18 are coupled to the boom 17 at intervals along its length commensurate with the spacing of the rows of the crop to be sprayed. Each of the arm assemblies 18 is identical in construction and thus a description of one will suffice for all.

Each arm asembly 18 includes an arm 19 disposed downwardly and rearwardly from the boom 17 in trailing relation. The arm 19 is coupled to the boom for pivotal movement within a vertical plane disposed at right angles to the boom. As best shown in FIGS. 2 and 3, a bushing 20 is welded or otherwise secured to the upper end of the arm 19 so as to extend transversely beneath the arm. A U-shaped bracket 21 is disposed to receive the bushing 20 such that a pin 22 may be inserted through the bracket 21 and bushing 20 as shown. A cotter pin 23 retains the pin 22 in assembled relation. The bracket 21 is bolted or otherwise secured to a mounting strap 24 having a leg portion 25 extending downwardly and rearwardly from the bracket 21.

A pair of plate members 26 and 27 are mounted on the boom 17 in spaced parallel relation to receive the arm 19 therebetween. Each of the plate members includes an outturned flange 28 to which the leg portion 25 of the strap 24 is bolted as shown. The plate members 26 and 27 are secured to the boom 17 by means of bolts 29 extending through the flanges 28 on opposite sides of the boom. The bolts 29 extend through a plate 30 disposed parallel to the flanges 28, with the boom being held therebetween.

In the preferred embodiment shown, the boom 17 is oriented so that the pivot connection of the arm 19 about the pin 22 is disposed upwardly and forwardly of the boom as best shown in FIG. 3. Accordingly, the upper portion of the arm 19 is disposed above the boom so that the same provides a limit for downward pivoting movement of the arm.

As shown in FIG. 3, the plate members 26 and 27 are preferably substantially trapezoidal so as to straddle the arm 19 throughout a substantial pivoting movement of the arm about the pin 22. If desired, a cross-pin 31 may be coupled between the plate members to serve as a limit for upward pivoting movement of the arm.

As shown generally in FIG. 1, the arm 19 includes a segment 32 being hollow throughout a substantial portion of the length of the arm from its upper end toward its lower end. A shank portion 33 extends downwardly from the hollow segment 32 at an angle thereto for purposes to be described.

The hollow segment 32 of the arm is arranged to receive a flexible hose 34 for conveying fluid to a spray device 35 mounted on the shank portion 33. It will be understood that the hose 34 is connected to a source of supply of fluid (not shown) on the carrier 10. Since the shank portion 33 is angled with respect to the segment 32, the hose 34 may extend from the lower end of the segment 32 without obstruction by the shank portion.

As best shown in FIG. 4, the spray device 35 may include a pair of spray nozzles 36 and 37 fitted on a pair of flow pipes 38 and 39, respectively. A T connection 40 is fitted on the pipe 39 for coupling to the end of the hose 34. A hose 41 extends from the T connection 40 to an elbow connection 42 fitted on the pipe 38. It will thus be apparent that the flow of fluid from the hose 34 is divided at the T connection 40 to be emitted through both nozzles 36 and 37.

The above described spray device is adapted to be readily convertible or adjustable to perform a variety of spraying operations. Toward that result, a bar 43 is mounted on the shank portion 33 by means of a strap 44 and a pair of bolts 45 and 46 extending through the strap 44 on opposite sides of the shank portion for connection to the bar 43. In the embodiment shown, the bar 43 is disposed generally horizontally and within the vertical plane of the arm 19 and extends forwardly and rearwardly relative to the shank portion 33. The pipes 38 and 39 are mounted on the bar 43 by clamps 47 and 48 respectively which when loosened permit the nozzles to be disposed at selected positions vertically relative to the bar 43. Moreover, the clamps 47 and 48 and the associated pipes 38 and 39 may be disposed at selected positions along the length of the bar 43. Thus, for example, the pipe 39 and the associated nozzle 37 may be readily mounted rearwardly of the shank portion 33 while the nozzle 36 is left in the position shown. It will be seen that the connection of the bar 43 to the shank portion 33 permits the entire spray device to be disposed at selected positions vertically on the shank portion.

As shown generally in FIG. 1 and more specifically in FIG. 4, a ground engaging runner 49 is pivotally connected to the lower end of the shank portion 33 to support the arm 19 in trailing relation. Accordingly, the spray device 35 is maintained at a predetermined height above the ground regardless of ground level variations encountered as the carrier moves along the crop rows being sprayed.

The principal advantages provided by the invention will be clearly seen with reference to a description of the operation. The boom assembly of the invention is lowered into operative position wherein each of the runners contacts the ground. As the carrier is moved along the crop rows, the arms 19 are free to pivot upwardly and downwardly in the direction of the arrows in FIG. 3 in accordance with ground level variations. The repeated pivoting movement of the arm naturally results in wear of the pivot connection of the arm to the boom. As shown in FIG. 2, this wear would permit the arm to wobble or swing laterally in the direction of the arrows about a theoretical pivot point A. The present invention, however includes the plate members 26 and 27 which are positioned to restrict movement of the arm to pivoting movement within a vertical plane disposed at right angles to the boom. Accordingly, the spray device carried on the arm will be prevented from moving laterally relative to the crop rows. This results in more accurate placement of the spray pattern.

Since a substantial portion of the fluid-conducting hose is disposed within the arm, the hose is protected from contact and entanglement with the crop. Moreover, the arm is not subject to the corrosive effects of the chemicals being sprayed.

As above described, the spray device is readily convertible or adjustable on the arm so that a wide variety of spray directions and patterns is available without requiring the structure to be modified. In other words, special equipment or separate components are not required for directed spray and layby spraying operations.

It will be understood that the sprayer boom assembly of the invention may be mounted on the front of a mobile carrier as well as on the rear thereof as various spraying operations may require.

Various changes falling within the scope and spirit of the invention may occur to those skilled in the art. The invention is, therefore, not to be thought of as limited to the specific embodiment set forth.

What is claimed is:

1. In a sprayer boom assembly adapted for mounting on a mobile carrier movable along crop rows and operative for spraying operations and having lift means mounted on said carrier and operative to lift and lower said boom assembly to corresponding transport and operating positions, the improvement comprising:

a boom extending transversely to the direction of travel of the carrier and operatively connected to said lift means;

arm means pivotally carried on said boom to provide pivoting movement for travel in an upright plane disposed transversely to said boom, said arm extending downwardly and rearwardly from said boom in trailing relation thereto;

abutment means operatively connected to said boom and engaging said arm means to predeterminatively limit downward travel of said arm means and to effect a coordinating lifting response in said arm which corresponds to a lift of said boom being lifted toward transport position by said lifting means;

spray means mounted on the lower portion of said arm and operative for directing fluid spray;

guide means on said boom for preventing displacement of said arm laterally beyond said transverse plane whereby said spray device is prevented from moving from its transverse orientation relative to the crop rows;

said arm means is coupled to said boom by means of a pivot connection disposed upwardly and forwardly of said boom, the upper portion of said arm being disposed above said boom to position said arm means and said boom in a coacting relation therebetween to have said boom serve as said abutment means to limit downward travel of said arm about said pivot connection within said upright plane and to lift said arm in response to said boom being lifted by said lift means; and said guide means including a pair of plate members mounted on said boom in spaced parallel relation so as to receive said arm means therebetween along a portion thereof between said pivot connection and said lower portion to prevent said arm from swinging laterally about said pivot connection out of said upright plane.

2. The subject matter of claim 1, including ground engaging means mounted on the lower end of said arm means for operatively supporting said arm means within a range of operation in spaced relation to said abutment means, whereby said spray means is maintained at a predetermined height above the ground regardless of ground level variations within that range.

3. In a sprayer boom assembly adapted for mounting on a mobile carrier movable along crop rows and operative for spraying operations and having lift means mounted on said carrier and operative to lift and lower said boom assembly to corresponding transport and operating positions, the improvement comprising:

a boom extending transversely to the direction of travel of the carrier and operatively connected to said lift means;

arm means pivotally carried on said boom to provide pivoting movement for travel in an upright plane disposed transversely to said boom, said arm extending downwardly and rearwardly from said boom in trailing relation thereto;

abutment means operatively connected to said boom and engaging said arm means to predeterminatively limit downward travel of said arm means and to effect a coordinating lifting response in said arm which corresponds to a lift of said boom being lifted toward transport position by said lifting means;

spray means mounted on the lower portion of said arm and operative for directing fluid spray;

guide means on said boom for preventing displacement of said arm laterally beyond said transverse plane whereby said spray device is prevented from moving from its transverse orientation relative to the crop rows; and ground engaging means mounted on the lower end of said arm means for operatively supporting said arm within a range of operation in spaced relation to said abutment means, said spray means including a spraying device mounted on said ground engaging means by means including a bar coupled to said ground engaging means and extending generally horizontally substantially within said upright plane, said spraying device including a pair of nozzles adjustably mountable on said bar for selective positioning along the length of said bar and at selected positions vertically relative to said bar, whereby said spraying device is adjustable to perform a variety of spraying operations.

4. In a sprayer boom assembly adapted for mounting on a mobile carrier movable along crop rows for spraying operations and having lift means mounted on said carrier and operative to lift and lower said boom assembly to corresponding transport and operating positions, an improvement comprising:

a horizontal boom extending transversely to the direction of travel of the carrier;

an arm mounted on said boom for pivoting movement in an upright plane disposed transversely to said boom, said arm being coupled to said boom by means including a pivot connection disposed above and forwardly of said boom, said arm extending downwardly and rearwardly from said pivot connection such that an upper portion of said arm is disposed above said boom to provide a positional relationship therebetween such that said boom serves as an abutment means to predeterminatively limit downward pivoting movement of said arm about said pivot connection within said upright plane, and to effect a coordinating lifting response in said arm which correspond to a lifting of said boom by said lifting means, said arm being hollow throughout a substantial portion of its length from said pivot connection to its lower end;

a spray device mounted on the lower portion of said arm for directing fluid spray toward the ground;

a flexible hose on said boom for conveying fluid to said spray device, said hose being disposed through said hollow portion of said arm so that the hose within said hollow portion is protected from contact and entanglement with the crop being sprayed; and guide means for said arm including a pair of plate member mounted on said boom in spaced parallel relation so as to receive said arm therebetween along a portion thereof between said pivot connection and said lower portion to prevent said arm and said enclosed hose from swinging laterally about said pivot connection out of said vertical plane.

5. The subject matter of claim 4, including ground engaging means mounted on the lower end of said arm for operatively supporting said arm within a range of operation in spaced relation to said boom, whereby said spray device is maintained at a predetermined height above the ground regardless of ground level variations within that range.

References Cited

UNITED STATES PATENTS

| | | | |
|---|---|---|---|
| 1,656,171 | 1/1928 | Cox | 239—159 X |
| 2,641,505 | 6/1953 | Valois | 239—168 |
| 3,202,359 | 8/1965 | Gill | 239—172 X |
| 559,042 | 4/1896 | Potter | 239—169 |
| 583,579 | 6/1897 | Otis | 222—533 |
| 1,526,642 | 2/1925 | Nissley | 239—164 |
| 2,548,209 | 4/1951 | Foster | 239—167 X |
| 2,663,973 | 12/1953 | White | 239—172 |
| 3,023,970 | 3/1962 | Knoell | 239—167 |
| 3,310,239 | 3/1967 | Hesp et al. | 239—169 |

FOREIGN PATENTS

| | | |
|---|---|---|
| 154,283 | 11/1953 | Australia. |
| 558,166 | 5/1923 | France. |

SAMUEL F. COLEMAN, Primary Examiner